Feb. 26, 1935.  R. A. GOEPFRICH  1,992,207
BRAKE
Filed Jan. 29, 1931

INVENTOR.
RUDOLPH A. GOEPFRICH
BY
ATTORNEY

Patented Feb. 26, 1935

1,992,207

UNITED STATES PATENT OFFICE 1,992,207

BRAKE

Rudolph A. Goepfrich, South Bend, Ind., assignor to Bendix Brake Company, South Bend, Ind., a corporation of Illinois Application January 29, 1931, Serial No. 511,995

11 Claims. (Cl. 188—78)

This invention relates to brakes and more particularly to internal expanding brakes.

Broadly, the invention comprehends a fixed support having associated therewith a rotatable drum, together with interchangeable shoes or friction elements connected by linkage including bell crank levers adjustably positioned on the fixed support and so arranged that when force is applied through the operating cam to spread the shoes for engagement with the drum, the levers are rocked and through their connections apply force to both the heel and toe of the auxiliary shoe.

An object of the invention is to provide means for more effectively applying the friction elements.

Another object of the invention is to provide a brake structure embodying means for distributing the applied force with a substantial increase due to the wiping action of the drum to the heel and toe of the secondary shoe.

Another object of the invention is the production of a brake in which the structure is exceedingly cheap and simple and which will efficiently perform its intended function.

A further object of the invention is to provide a brake having relatively few interchangeable parts which may be easily and quickly assembled.

Other objects of the invention will appear from the following description taken in connection with the drawing, which forms a part of this specification, and in which.

Figure 1:
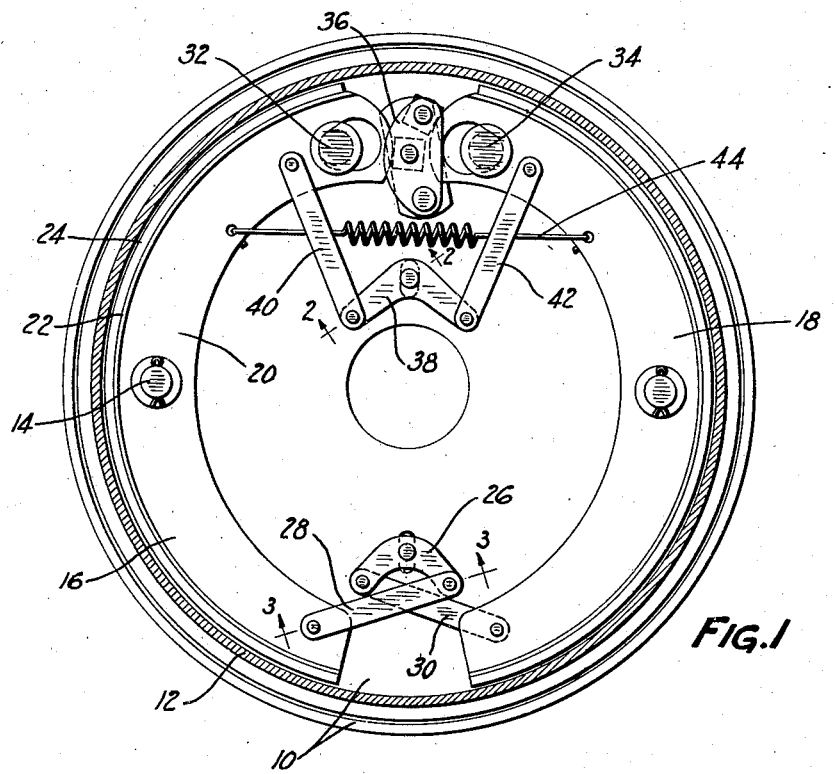
Figure 1 is a vertical sectional view taken just back of the head of the drum illustrating the invention as applied.
Figure 2:
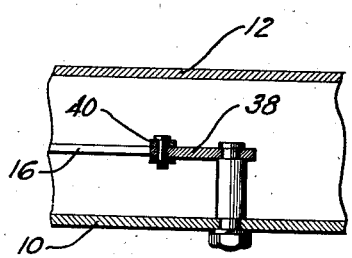
Figure 2 is a sectional view substantially on line 2—2, Figure 1.
Figure 3:
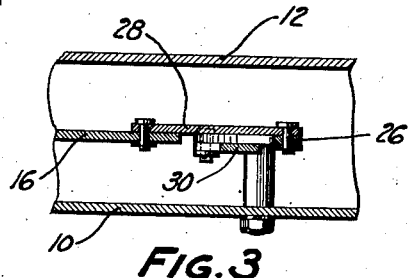
Figure 3 is a sectional view substantially on line 3—3, Figure 1.

Referring to the drawing for more specific details of the invention, 10 represents a fixed support such as a backing plate, and associated with the backing plate is a rotatable drum 12. As shown, the backing plate has positioned thereon suitable steady rests 14 supporting interchangeable shoes 16 and 18. Each of the shoes comprises a web 20 supporting a rim 22 to which is suitably secured a lining 24 adaptable for co-operation with the braking surface of the drum.

Adjustably positioned on the backing plate 10 is a bell crank lever 26, one end of which is connected by a link 28 to the articulated end of the shoe 16 and the other end of the bell crank lever is connected by a link 30 to the articulated end of the shoe 18. It will be observed that the links 28 and 30 are arranged in transverse relation with respect to each other, the object of which will hereinafter appear.

The separable ends of the friction elements 16 and 18 are provided with transverse openings for the reception of suitable anchors 32 and 34, and mounted on the backing plate between the separable ends of the friction elements 16 and 18 is a floating operating cam 36. Since this cam forms no part of the present invention, description thereof is deemed unnecessary.

Adjustably mounted on the backing plate adjacent the operating cam is a bell crank lever 38 having one end connected by a link 40 to the shoe 16 and its other end connected by a link 42 to the shoe 18, the object of which will hereinafter appear, and the shoes 16 and 18 are connected by a suitable return spring 44. This spring serves to return the shoes to the off position and to retain them when in this position in proper spaced relation to the braking surface of the drum.

Each of the levers 26 and 38 is centrally mounted on a pivot clamped (e. g. by a nut threaded on its end) in a radially-extending slot in the backing plate, and can be adjusted by loosening the nut and tapping the pivot to shift it in its slot. Adjustment of lever 26 downward spreads the lower ends of the shoes apart to adjust the brake for wear. Lever 38 is adjusted to bring both shoes against anchors 32 and 34 when the brake is released.

When the cam is rotated to apply the brake, the shoe 16 is moved into engagement with the braking surface of the drum. This movement of the shoe rocks the bell crank lever 38 through the link 40 to apply pressure through the link 42 to the secondary shoe 18. Simultaneously with this movement, pressure is applied through the shoe 16 with a substantial increase due to the wiping action of the drum to the link 28 to rock the bell crank lever 26 which applies pressure through the link 30 to the articulated end of the auxiliary shoe 18. Since the bell crank levers 26 and 38 may be readily adjusted on the backing plate, the relation of the shoes 16 and 18 to the braking surface of the drum may be readily determined.

While preferred embodiments of the invention have been described, it is to be understood that these are given merely as examples of the underlying principles of the invention, and since these may be incorporated in other specific mechanical structures, I do not intend to be limited to those shown, except as such limitations are clearly imposed by the appended claims.

Having thus described the various features of the invention, what I claim as new and desire to secure by Letters Patent is:

1. A brake comprising friction elements having their respective opposite ends connected by linkages including bell crank levers, and an applying device separate from said linkages and acting on said shoes.

2. A brake comprising corresponding friction elements and linkages connecting the opposite respective ends of the friction elements, and an applying device separate from said linkages and acting on said shoes.

3. A brake comprising a pair of corresponding friction elements, a pair of linkages each connecting one pair of ends of the friction elements including bell crank levers and adjustable means supporting the bell crank levers.

4. A brake comprising a pair of corresponding friction elements, bell crank levers, adjustable means supporting the levers and means connecting each of the levers to two adjacent ends of the friction elements.

5. A brake comprising a backing plate, corresponding friction elements arranged end to end thereon, two bell crank levers adjustable on the backing plate and links connecting each of the levers to the ends of both of the friction elements.

6. A brake comprising corresponding friction elements arranged end to end and having an anchorage and a linkage separate from said anchorage and connecting the adjacent ends of the friction elements including a bell crank lever, and links connecting each end of said lever to the opposite one of the friction elements.

7. A brake comprising a backing plate, friction elements arranged end to end thereon, two bell crank levers adjustably arranged on the backing plate, links connecting the ends of one of the levers to the separable ends of the friction elements and links connecting the ends of the other lever to the articulated ends of the friction elements.

8. A brake comprising a backing plate, a drum associated therewith, corresponding friction elements arranged end to end on the backing plate for co-operation with the drum and two bell crank levers adjustable on the backing plate, one of the bell crank levers having its respective ends connected to the separable ends of the friction elements, the other bell crank lever having its respective ends connected to the articulated ends of the friction element by links arranged in transverse relation.

9. A brake comprising friction elements arranged end to end, a pivoted lever, and links arranged to cross each other in transverse relation and connecting the ends of the lever to the adjacent ends of the friction elements.

10. A brake comprising a fixed support, friction elements arranged end to end thereon, an adjustable support on the fixed support, a bell crank lever pivoted at its knee on the adjustable support and two links arranged in transverse relation and connected between the ends of the lever and the adjacent ends of the friction elements.

11. A brake comprising a fixed support, friction elements arranged end to end on the fixed support, an adjustable member on the fixed support, a bell crank lever pivoted at its knee to the adjustable member and two links each pivoted at one end to the respective ends of the lever and having their other ends pivoted to the articulated ends of the friction elements, said links being arranged to cross each other transversely with respect to each other.

RUDOLPH A. GOEPFRICH.